United States Patent Office

2,726,270
Patented Dec. 6, 1955

2,726,270

METHOD FOR THE PREPARATION OF TERTIARY ALKYL PHENOLS

Fred Bryner, Midland, Mich., assignor to The Dow Chemical Company, Midland, Mich., a corporation of Delaware No Drawing. Application October 4, 1951,
Serial No. 249,813

6 Claims. (Cl. 260—624)

This invention relates to an improved method for the preparation of tertiary alkyl phenols.

It is well known that tertiary alkyl phenols can be prepared by reacting the phenol with an iso-olefin, having the number of carbon atoms of the tertiary alkyl group to be introduced into the phenol molecule, in the presence of substantial amounts of aluminum chloride catalyst. These reactions are not altogether satisfactory, however, in that the crude reaction product contains a mixture of the ortho and para substituted phenols along with other by-products. If the para derivative is desired, it is sometimes difficult to separate from the reaction mixture and is usually recovered in poor yield. A further disadvantage is in the common use of several per cent of the catalyst which must be neutralized upon completion of the reaction and consequently introduces an inconvenient and time-consuming step of filtering the spent catalyst from the crude reaction mixture prior to its purification.

An object of the present invention, then, is to provide a method for the preparation of tertiary alkyl phenols which avoids the reaction difficulties discussed. Another object is to find an improved catalyst for use in preparing tertiary alkyl phenols.

According to the invention, iso-olefins may be reacted with any of a group of phenols, viz. hydroxylated aromatic hydrocarbons and mono-halo derivatives thereof, in the presence of minute catalytic amounts of iron chloride and a hydrogen halide, to form tertiary alkyl phenols in good yield.

Although widely varying proportions of reactants may be employed in the present process, generally one mole of the iso-olefin is used to about 1.5 to 2 or 3 mols of the phenol to be reacted. According to one procedure, the molten or dissolved phenol is stirred with minute catalytic amounts of an iron chloride (about 0.01 to 0.02 per cent by weight of the phenol) and of a slightly greater amount of a hydrogen halide (about 0.075 to 0.25 per cent by weight of the phenol), and the mixture is heated to a reaction temperature of 55° to 150° C., usually 90° to 110° C., and the iso-olefin is added slowly, with continued agitation. The resulting mixture is then heated for a time to insure completion of reaction, after which it is cooled, neutralized, and fractionally distilled at reduced pressure to separate the desired tertiary alkyl phenol. If the phenolic reactant is a solid at operating temperatures, the reaction may be conducted in an inert solvent. The hydrogen halide catalyst may be added as a gas or in aqueous solution, as desired.

When alkylation of a phenol is carried out as described, the reaction product is in most instances largely a para-substituted phenol, provided a position para to a hydroxyl group is open for substitution. When such para position is not open, the alkyl group will enter a position ortho to a hydroxyl group. If, however, all the positions ortho and para to the hydroxyl groups are filled, reaction according to the invention has not been found possible. For that reason, the phenolic reactants in our process are limited to hydroxylated aromatic hydrocarbons and their mono-halo substitution products which have a hydrogen atom in at least one of the positions ortho and para to a hydroxyl group. Examples of such phenols are: phenol, o-cresol, m-cresol, p-cresol, thymol, p-tertiary butyl-phenol, o-chloro phenol, monobromo carvacrol, catechol, resorcinol, pyrogallol, alpha naphthol, mono-chloro beta naphthol, o-phenyl phenol, p-phenyl phenol, alpha anthrol, and the like.

The olefinic reactant in the present process is an iso-olefin of at least 4 carbon atoms. Examples of such olefins are: isobutylene, isoamylene, isohexene, isoheptene, isooctylene and others in the series including compounds of the diisobutylene type. These compounds may all be reacted with any of the type of phenols hereinbefore defined to form the corresponding tertiary alkyl phenol.

The hydrogen halide catalyst in the present process is limited to hydrogen chloride or hydrogen bromide. Aqueous hydrogen fluoride is practically inoperable as a catalyst, and hydrogen iodide gives results markedly inferior to those of the invention. An iron halide catalyst is simultaneously employed with the hydrogen halide. Ferrous chloride may be used as the catalyst but ferric chloride is preferred.

It will be appreciated that an advantage of the present process is that the reaction between a phenol and an iso-olefin takes place without formation of an undesirably large proportion of by-product. When para substitution is possible, this reaction forms para-tertiary alkyl phenol in high yield. Furthermore, the catalytically small amount of iron halide and hydrogen halide employed in the present process may be neutralized at the end of the reaction with an amount of alkali insufficient to necessitate filtration of the neutralized catalyst prior to purification of the alkyl phenol via fractional distillation.

The following examples will illustrate our new reaction, but are not to be construed as limiting the scope of the invention:

Example 1

A mixture of 2 mols (188 grams) of phenol, 0.019 gram (0.01 per cent by weight based on phenol) of ferric chloride, and 0.16 gram (0.085 per cent by weight based on phenol) of dry hydrogen chloride was heated to a temperature of about 90° C., and 1 mole of isobutylene was passed slowly into the mixture with agitation in about 33 minutes. The mixture was then heated at 95° C. to 100° C. for an additional 70 minutes, after which it was cooled, neutralized with aqueous sodium hydroxide, and fractionally distilled at an absolute pressure of 25 millimeters of mercury. In this way there were recovered unreacted phenol, and 138 grams of p-tertiary butylphenol, boiling at 134° to 135° C. at 25 millimeters pressure. The yield of this latter product was 92 per cent, based on the phenol which had reacted.

Example 2

Isobutylene was reacted with o-chlorophenol in the presence of 0.23 per cent hydrogen chloride and 0.021 per cent ferric chloride by weight, based on the phenol, employed under the same conditions as in Example 1, and the product was purified in an analogous manner. There was obtained an 87 per cent yield of p-tertiary butyl-o-chlorophenol having a boiling point at 25 millimeters pressure of 128–131° C.

Example 3

Isobutylene was reacted with o-cresol under similar reaction conditions to yield 92 per cent by weight based on reacted cresol, of purified p-tertiary butyl-o-cresol boiling in the range of 138° to 139° C. at 25 millimeters pressure.

*Example 4*

Isobutylene was reacted with o-phenylphenol under similar reaction conditions to yield 79 per cent by weight, based on reacted phenylphenol, of p-tertiary butyl-o-phenylphenol, boiling in the range of 200° to 203° C. at 25 millimeters pressure.

*Example 5*

2-methyl-2-butene was reacted with phenol under similar reaction conditions to yield 63 per cent by weight, based on reacted phenol, of p-tertiary amylphenol boiling in the range of 148° to 155° C. at 25 millimeters pressure.

*Example 6*

Diisobutylene was reacted with phenol under similar reaction conditions to yield 92 per cent by weight, based on reacted phenol, of p-(1,1,3,3-tetramethylbutyl)phenol boiling in the range of 173° to 176° C. at 25 millimeters pressure.

*Example 7*

Isobutylene was reacted with m-cresol under similar reaction conditions to yield 78 per cent by weight, based on reacted cresol, of o-tertiary butyl-m-cresol boiling in the range of 133° to 135° C. at 25 millimeter pressure.

*Example 8*

In comparative studies employing an aluminum chloride-hydrogen chloride system, a mixture consisting of 2 moles (188 grams) of phenol, 0.44 gram (0.23 per cent weight based on phenol) of anhydrous hydrogen chloride, and 0.04 gram (0.021 per cent weight based on phenol) of anhydrous aluminum chloride was heated with 1 mole of isobutylene under the same conditions as in Example 1. About 91 per cent of the isobutylene charge was recovered at the end of the reaction. By increasing the amount of aluminum chloride in the catalyst system to 0.1 per cent by weight of the phenol, about 89 per cent by weight of unreacted isobutylene was recovered in a similar experiment.

*Example 9*

In further comparative experiments employing only 0.1 per cent by weight, based on phenol, of anhydrous hydrogen chloride as the catalyst, 1 mole of isobutylene was heated with 2 moles of phenol containing the hydrogen chloride catalyst under similar conditions to those used in Example 1. At the end of the reaction about 90 per cent by weight of unreacted isobutylene was recovered. In a similar experiment in which 0.021 per cent by weight of ferric chloride was substituted for the 0.1 per cent hydrogen chloride catalyst, about 78 per cent by weight of unreacted isobutylene was recovered at the end of the reaction.

Example 9 clearly demonstrates that neither ferric chloride nor hydrogen chloride alone, in the small amounts that are used together successfully in the new catalytic process, can satisfactorily catalyze the alkylation reaction between phenols and iso-olefins. The synergistic effect of the ferric chloride-hydrogen halide system, illustrated in Examples 1 to 7, is necessary for high yields and para-substitution of the alkyl radical in the phenol molecule. The catalytic effect of ferric chloride in the ferric chloride-hydrogen halide system is specific, since the substitution of aluminum chloride in the system, as seen in Example 8, results in substantially no alkylation reaction. In view of this, it is both surprising and unexpected that minute amounts of ferric chloride and hydrogen halide in combination promote primarily para-substitution of iso-olefins in phenol molecules in excellent yield in the method of the present invention.

I claim:

1. The method of making a tertiary alkyl phenol which comprises reacting an iso-olefin with a phenol having a hydrogen atom in one of the positions ortho and para to a hydroxyl group and selected from the class consisting of hydroxylated aromatic hydrocarbons and hydroxylated mono-halo-aromatic hydrocarbons, in the presence of from 0.01 to 0.02 per cent of an iron chloride and from 0.075 to 0.25 per cent of a hydrogen halide selected from the class consisting of hydrogen chloride and hydrogen bromide based on the weight of the phenol.

2. The method of making a para-tertiary alkyl phenol which comprises reacting an iso-olefin with a phenol having a hydrogen atom in the position para to a hydroxyl group and selected from the class consisting of hydroxylated aromatic hydrocarbons and hydroxylated mono-halo-aromatic hydrocarbons, in the presence of from 0.01 to 0.02 per cent of ferric chloride and from 0.075 to 0.25 per cent of a hydrogen halide selected from the class consisting of hydrogen chloride and hydrogen bromide based on the weight of the phenol.

3. The method as claimed in claim 2 wherein the iso-olefin is isobutylene.

4. The method as claimed in claim 2 wherein the phenolic compound subjected to alkylation is phenol.

5. The method of making a para-tertiary alkyl phenol which comprises reacting one mole of an iso-olefin with about 1.5 to 3 moles of a phenol having a hydrogen atom in the position para to a hydroxyl group and selected from the class consisting of hydroxylated aromatic hydrocarbons and hydroxylated mono-halo-aromatic hydrocarbons, in the presence of from 0.01 to 0.02 per cent of ferric chloride and from 0.075 to 0.25 per cent of hydrogen chloride based on the weight of the phenol, and at a temperature between about 55° C. and about 150° C.

6. The method of making para-tertiary butylphenol which comprises reacting one mole of isobutylene with about 2 moles of phenol in the presence of from 0.01 to 0.02 per cent of ferric chloride and from 0.075 to 0.25 per cent of hydrogen chloride based on the weight of the phenol, and at a temperature between about 90° C. and 110° C.

References Cited in the file of this patent

UNITED STATES PATENTS

| Number | Name | Date |
|---|---|---|
| 2,107,060 | Olin | Feb. 1, 1938 |
| 2,154,192 | Zinke | Apr. 11, 1939 |
| 2,189,805 | Kyrides | Feb. 13, 1940 |
| 2,403,013 | Meadow | July 2, 1946 |
| 2,560,666 | Stevens et al. | July 17, 1951 |